United States Patent [19]
DeGroff

[11] Patent Number: 5,011,341
[45] Date of Patent: Apr. 30, 1991

[54] TWO SPEED GEAR SYSTEM FOR POWER TOOL

[75] Inventor: Morton S. DeGroff, Stryker, Ohio

[73] Assignee: The Aro Corporation, Bryan, Ohio

[21] Appl. No.: 434,925

[22] Filed: Nov. 9, 1989

[51] Int. Cl.$^5$ .............................................. B23B 47/04
[52] U.S. Cl. ...................................... 408/124; 475/337
[58] Field of Search ..................... 408/124, 139, 141; 475/223, 248, 295, 298, 332, 337

[56] References Cited

U.S. PATENT DOCUMENTS

| | | |
|---|---|---|
| 1,442,123 | 1/1923 | Brown . |
| 1,564,342 | 12/1925 | Gebhardt et al. . |
| 1,684,633 | 9/1928 | Leyedahl . |
| 1,839,648 | 1/1932 | Connell . |
| 1,858,276 | 5/1930 | Miller . |
| 1,913,046 | 6/1933 | Callan . |
| 1,984,282 | 12/1984 | Ray . |
| 2,127,855 | 8/1938 | Baumgratz et al. . |
| 2,184,394 | 12/1939 | Moretti . |
| 2,446,363 | 8/1948 | Daum ..................................... 192/48 |
| 2,475,518 | 7/1949 | Ristow . |
| 2,854,831 | 10/1958 | Rothweiler ............................. 64/21 |
| 3,559,507 | 2/1971 | Magner ................................ 475/337 |

FOREIGN PATENT DOCUMENTS

| | | |
|---|---|---|
| 40261 | 11/1981 | European Pat. Off. ............ 408/124 |
| 485885 | 11/1929 | Fed. Rep. of Germany . |
| 2321384 | 12/1973 | Fed. Rep. of Germany ...... 408/124 |
| 2941356 | 4/1981 | Fed. Rep. of Germany ...... 408/124 |
| 3334249 | 4/1985 | Fed. Rep. of Germany ...... 408/124 |
| 3525208 | 1/1986 | Fed. Rep. of Germany ...... 408/124 |
| 3736413 | 5/1989 | Fed. Rep. of Germany ...... 408/124 |

OTHER PUBLICATIONS

Photocopy of Photograph-DeSoutter Lever Operated Air Tool.
S & L Maskin AB, Stenungsun, Sweden Brochure--Three pages.

*Primary Examiner*—William Briggs
*Attorney, Agent, or Firm*—Allegretti & Witcoff, LTD.

[57] ABSTRACT

A pneumatic power tool having a rotary driven output spindle defining an axis, an air motor having an output shaft axially aligned with the output spindle, transmission means connecting the output shaft and the spindle, and control means for operating the air motor. Incorporated in the transmission means is a two speed gear system to provide a first drive having a lower torque output and a second gear reduced having a higher torque output and a lower rotary speed output relative to the first drive. The two speed gear system also includes a spindle assembly which is axially translatable, biasing means for biasing the spindle assembly to the first drive position, and a collar rotatable about the axis and including a follower cooperative between the spindle assembly and the collar to effect axial movement of the spindle assembly between the first and second drive positions.

5 Claims, 2 Drawing Sheets

TWO SPEED GEAR SYSTEM FOR POWER TOOL

BACKGROUND OF THE INVENTION

1. Field of the Invention

The present invention relates to pneumatic power tools and more particularly to a two speed gear system for power drills capable for use both in drilling and countersinking operations.

2. Description of the Related Art

In aircraft assembly thousands of rivets are installed to hold the skin to the substructure of the aircraft. Surface finishes in the holes and the countersink surfaces for these rivets are critically important and are closely inspected. Experience has shown that tool speed and torque affect the surface tolerances.

Often one tool is used for the relatively high speed drilling of holes and a second tool is used for the relatively low speed high torque countersinking of the drilled holes.

In the aircraft industry, pneumatic tools, driven by air motors powered by compressed air are often used. The air motors are physically small and light for the high torque and power that it delivers. The air motor starts almost instantly and is inherently safe as compared to electric motors.

In a majority of pneumatic tools spring-loaded torque clutches are used. Units are available in which the driving bit is stopped by the stall torque principle, the magnitude of the torque that stalls the motor being governed by the air pressure setting.

Two systems of torque control are available for pneumatic tools. The first is the minimum torque indication system where the normal stalled torque motors are used in a conventional manner, but with a visual indication to the operator that the minimum torque value required has been achieved.

The second is a torque controlled motor system with visual indication. This system employs standard motors, each fitted with a control top. The torque reaction through the motor body is used to initiate an air signal which passes to the control top and shuts off the air to the motor. The movement of the control top shuttle valve actuates a relay which switches on an indicator light.

There is a need for a single pneumatic tool which is capable of both drilling and countersinking holes. Such pneumatic device must be capable of drilling the holes at high speed and then countersinking the holes at relatively low speed, but high torque.

The present invention provides a single power tool having one speed for drilling and another for countersinking with increased torque for countersinking by incorporating two planetary gear systems. The first planetary system transmits power to the drill. Upon completion of the hole drilling cycle, the second planetary system is cammed into mesh, resulting in a more desirable, reduced working speed and increased torque to perform the countersinking operation.

SUMMARY OF THE INVENTION

A two speed gear system according to the present invention is for use in a pneumatic power tool having a housing including a rotary driven output spindle, a motor having an output shaft axially aligned with the spindle, control means for operating the motor and transmission means connecting the output shaft with the spindle. The transmission means includes a two speed gear system for providing a first drive having a lower torque output and a second gear reduced drive having a higher torque output and a lower rotary speed output relative to the first drive. By rotating a sleeve on the housing, an axially translatable spindle assembly may be moved from a first position effecting the first drive to a second position effecting the second drive.

An object of the present invention is to provide an improved two speed gear system for pneumatic rotary power tools in which the low speed provides greater torque than the high speed.

Another object of the present invention is to provide a two speed transmission for power tools in which changing between high speed and low speed (and vice versa) is simple and quick.

A further object of the present invention is to provide a two speed transmission for pneumatic rotary power tools in which the speed and torque provided in each drive position will meet the design specifications of the aircraft industry.

The foregoing and other objects, features, aspects and advantages of the present invention will become more apparent from the following detailed description of the present invention when taken in conjunction with the accompanying drawings.

BRIEF DESCRIPTION OF THE DRAWINGS

The attached drawings illustrate a presently preferred embodiment of the present invention, wherein like numerals refer to like elements in the various views and wherein.

DESCRIPTION OF THE PREFERRED EMBODIMENT

Figure 1:
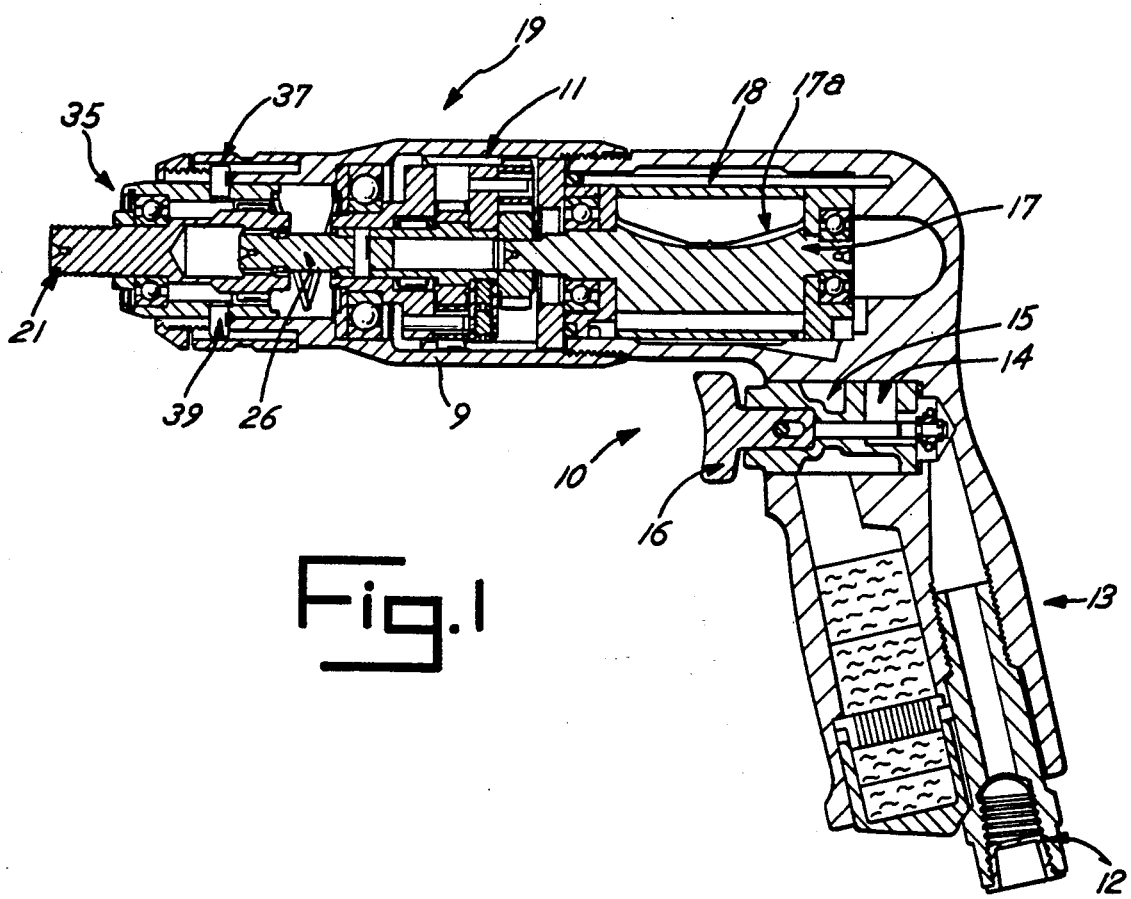
FIG. 1 a cross-sectional view of a power tool incorporating the two speed gear system of the present invention.
Figure 2:
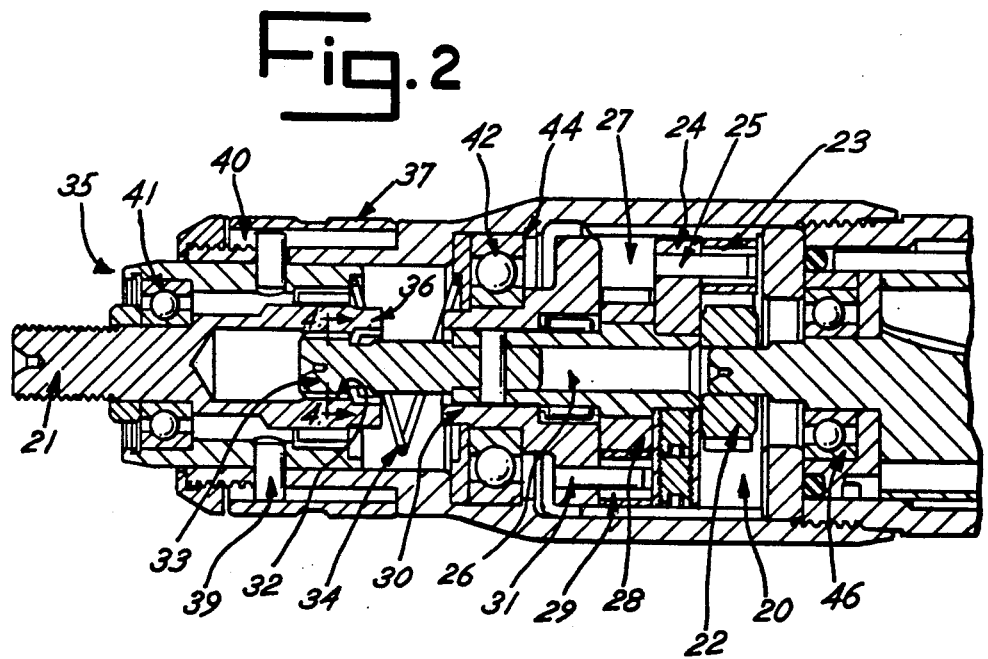
FIG. 2 is an enlarged cross-sectional view of the two speed gear system revealing the spindle assembly biased forward when the tool is engaged at the high speed, low torque position.

Referring to FIGS. 1 and 2, there is shown a power tool 10 having a housing 9 within which is disposed the novel two speed gear system 11 of the present invention.

Compressed air from a source such as an air compressor is transmitted through a line (not shown) to inlet 12 in the handle 13 of power tool 10. Air flows through the handle 13 of the power tool 10 into the air inlet valve compartment 14. The air inlet valve 15 is opened by control means or trigger 16 mounted in the handle 13.

Upon opening of the air inlet valve 15, air flows to the air motor 18.

Referring to FIGS. 1 and 2, air flows over longitudinal vanes 17a connected to a rotor 17 for rotating motor 18. A transmission means 19 operatively connects rotor 17, output motor shaft 26, and output spindle 21.

A first orbital gear member 20 is concentric with an axis defined by a output spindle 21. The sun gear 22 associated with the first orbital gear member 20 is concentric with the axis defined by output spindle 21. The sun gear 22 is directly connected to the rotor 17 such that sun gear 22 and rotor 17 rotate at equal speeds. Sun gear 22 meshes with planet gears 23 to reduce the power transmitted by the rotor 17. Planet gears 23 are journalled on pins 25 that are connected to disc 24.

The axis of output shaft 26 is coaxial with the axis formed by output spindle 21 and shaft 26 is independently rotatable about the axis relative to the first orbital gear member 20. Disc 24 is connected to output shaft 26 such that disc 24 and output shaft 26 rotate at equal speeds.

Output shaft 26 is connected to the sun gear 28 associated with the second orbital gear member 27 such that the sun gear 28 and output shaft 26 rotate at the same speed. Sun gear 28 continuously meshes with planet gears 29 to further reduce the power transmitted by the output shaft 26. Planet gears 29 are journalled on pins 31 that are connected to axial drive jaw member 30.

Figure 4:
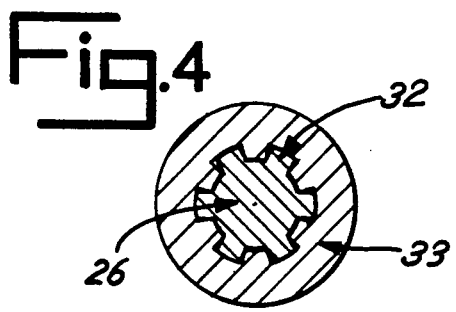
FIG. 4 is a transverse cross-sectional view through the spline tooth arrangement of the two speed gear system when the tool is engaged at the high speed, low torque position.

Output shaft 26 has an external spline tooth arrangement 32 at one end, which can cooperate with internal spline teeth 33 associated with the counterbore in the spindle 21. The teeth 32, 33 are constructed and arranged for complementary engagement during operation, as will be more fully explained hereinafter. When the power tool 10 is engaged in the first drive, having a high speed, low torque output, spring 34 acts to bias the spindle assembly 35 to the forward position, as illustrated in FIG. 2. When the spindle assembly 35 is in the forward position, spline tooth arrangement 32 cooperates with internal spline tooth arrangement 33, as better shown in FIG. 4, to effect direct drive of the spindle 21 by output shaft 26. Referring again to FIG. 2, while the power tool 10 is engaged in the first drive, axial drive jaw member 30 rotates at a reduced speed but does not engage with the output spindle 21.

Figure 3:
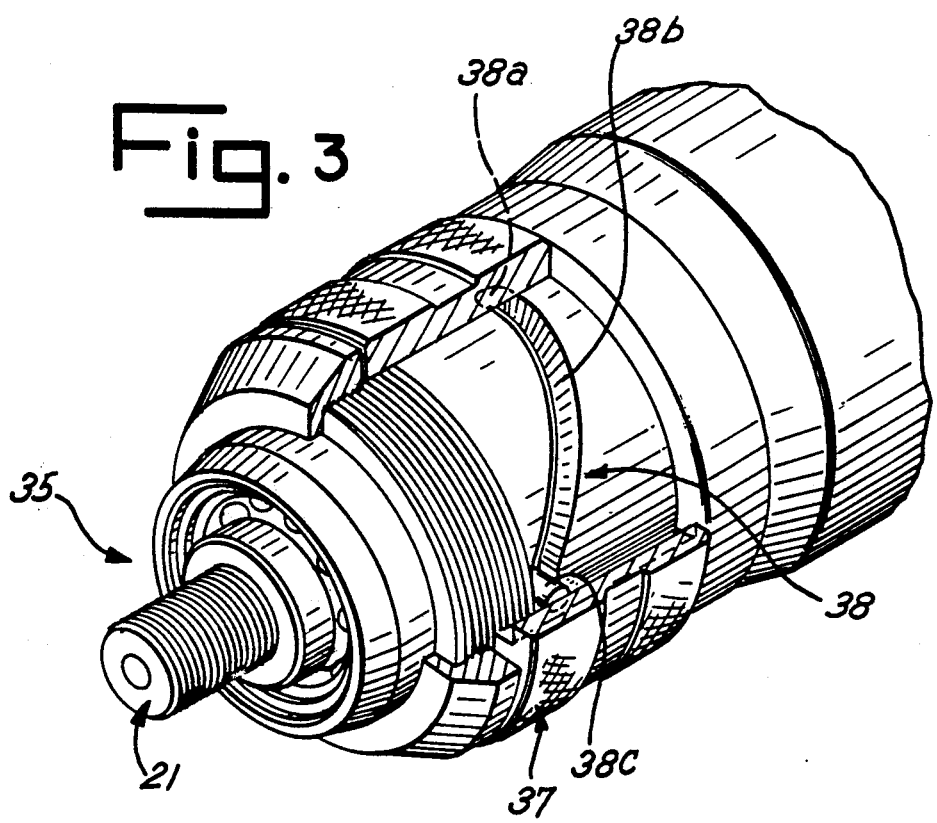
FIG. 3 is a perspective view of a portion of the housing of a two speed gear system with a portion cut away to reveal the cam.

The mechanism for changing from high speed low torque operation to low speed, high torque operation is best shown in FIG. 3. A collar 37 is manually rotatable on the housing 9. The collar 37 coacts with pin 39 in helical slot 38 to cam the spindle assembly 35 forwardly and rearwardly between first and second drive positions, or axially translatable between the first and second drive positions. The cam is defined by the slot 38 in the housing 9 (See FIGS. 2 and 5). As seen in FIG. 3, the cam has a transverse portion 38a, which corresponds to the high speed, low torque forward position. The cam has an angled portion 38b engaged when speed is being changed. The cam has a second transverse portion 38c, which corresponds to the low speed, high torque retracted position. Referring again to FIG. 2, the collar 37 cooperates with pins 39 which are positioned within axial slots 40 on the interior of the collar 37 also and act in slot 38. The pins 39 are fixed to spindle 35 and form a follower means to effect movement of the pins 39 and the attached spindle assembly 35 between the forward position shown in FIG. 2 and the retracted position shown in FIG. 5.

Figure 6:
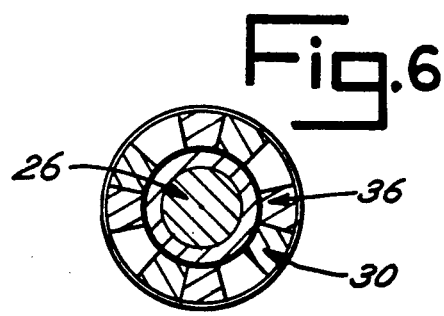
FIG. 6 is a sectional view through the spline tooth arrangement of a two speed gear system when the tool is engaged at the low speed, high torque position taken generally along the line 6—6 of FIG. 5.
Figure 5:
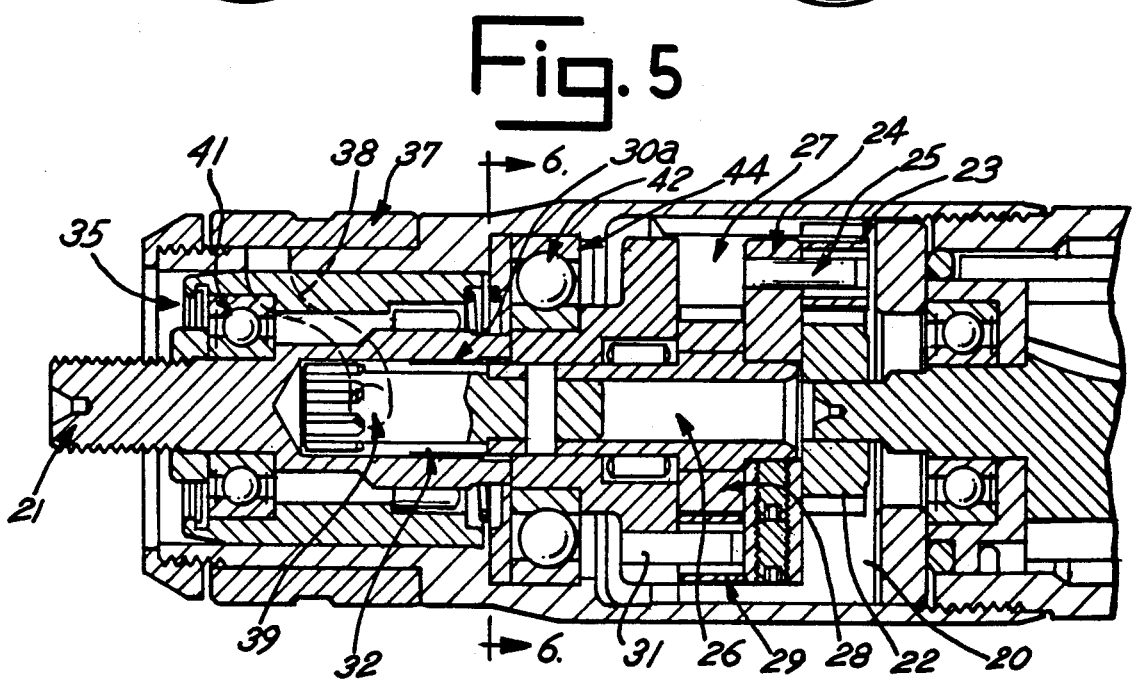
FIG. 5 is an enlarged cross-sectional view of the two speed gear system revealing a retracted spindle assembly in contact with the axial jaw members of the second orbital gear system when the tool is engaged at the low speed, high torque position.

Referring to FIG. 5, the output spindle 21 has an axial drive jaw member 36 associated with it. When the power tool 10 is engaged in the second gear reduced drive having a higher torque output and a lower rotary speed output relative to the first drive, the axial drive jaw member 36 cooperatively engages axial drive jaw member 30, as shown in FIG. 6, to drive the output spindle 21. Referring again to FIG. 5, to engage the second gear reduced drive, the collar 37 is rotated on housing 9. As the collar 37 is rotated, the spindle assembly 35 retracts against the spring 34. Spline tooth arrangements 32 and 33 disengage and the output shaft 26 moves forward relative to the counterbore of the spindle 21 such that it no longer cooperates with the spindle 21. The spindle assembly 35 will stop retraction upon engagement of axial gear means 30a comprising drive jaw member 36 and axial drive jaw member 30. By rotating the sleeve 37 in the reverse direction on housing 9, the second gear reduced drive is removed from engagement and the first drive is engaged. Preferably, the parts are constructed and arranged so that the first drive is fully disengaged before engagement of the second gear reduced drive.

In the preferred embodiment, the spline teeth 32 and 33, and the axial drive jaw members 36 and 30 have a point-like construction. The point-like construction of the cooperating spline teeth and jaw members, respectively, assists engagement when changing speeds such that the teeth and jaw members respectively seek tooth engagement. This design encourages quick and simple engagement of the drives. The spline teeth 32 and 33, as well as the jaw members 36 and 30, are hardened for maximum wear.

Bearing 41 is provided between the spindle assembly 35 and the output spindle 21 for facilitating rotation of spindle 21. Bearing 42 is provided between the housing 9 and the axial drive jaw member 30 for facilitating rotation of the axial drive jaw member 30. The bearing 42 is retained in place by a retaining ring 44. Bearing 46 is provided to help journal the rotor 17 of the air motor 18 for rotation.

Although a presently preferred embodiment of the present invention has been described and illustrated in detail, it is clearly understood that the same is by way of illustration and example only and is not to be taken by way of limitation. The spirit and scope of the present invention are limited only by the terms of the appended claims and their proper equivalents.

What is claimed:

1. In a power tool having a rotary driven output spindle defining an axis, a motor having an output motor shaft axially aligned with the spindle, transmission means connecting the output motor shaft with the spindle, and control means for operating the motor, the power tool further comprising, in combination:

a two speed gear system incorporated in the transmission means to provide a first drive having a higher speed, lower torque output, and a second gear reduced drive having a higher torque output and lower speed output relative to the first drive, said two speed gear system also including means for selectively engaging the first or the second drive;
said system comprising:
an orbital gear member concentric with the axis and motor shaft;
a sun gear driven by the motor;
a planetary gear mounted on a plate concentric with the axis, said sun gear continuously cooperative with the orbital gear member by means of the planetary gear to provide the second drive output from said plate, said sun gear also including axial gear means for cooperative direct driving engagement with the spindle in response to the means for selectively engaging the first drive;

said spindle also having a first axial gear means cooperative with the axial gear means of the sun gear;

said spindle further including second means for drivingly engaging the plate in the second drive position;

said means for selectively engaging including means for axially translating the spindle between the first drive position of engagement of the spindle and sun gear axial drive means and the second drive position of engagement of the spindle and plate.

2. The power tool of claim 1 wherein the means for selectively engaging comprise a spindle assembly which is axially translatable and further including biasing means for biasing the spindle assembly to the first drive position; and manually actuable means to effect axial translation of the spindle assembly between the first and second drive positions.

3. The power tool of claim 2 wherein the manually actuable means is a collar rotatable about the axis and including cam follower means cooperative between the spindle assembly and collar to effect axial movement between the first and second drive positions.

4. The power tool of claim 1 wherein said power tool is pneumatic and said motor is an air motor driven by compressed air.

5. The power tool of claim 1 including a plurality of planetary gears driven by the motor, said planetary gears being continuously cooperative with the sun gear to provide the second drive output.

* * * * *